(12) United States Patent
Sonoda et al.

(10) Patent No.: US 8,446,111 B2
(45) Date of Patent: May 21, 2013

(54) MOTOR FOR ELECTRIC POWER STEERING DEVICE WITH INTEGRATED CONTROLLER AND ELECTRIC POWER STEERING DEVICE

(75) Inventors: Isao Sonoda, Chiyoda-ku (JP); Yoshihito Asao, Chiyoda-ku (JP); Satoru Akutsu, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 444 days.

(21) Appl. No.: 12/812,673

(22) PCT Filed: Jul. 16, 2008

(86) PCT No.: PCT/JP2008/062814
§ 371 (c)(1),
(2), (4) Date: Jul. 13, 2010

(87) PCT Pub. No.: WO2009/125506
PCT Pub. Date: Oct. 15, 2009

(65) Prior Publication Data
US 2010/0288577 A1 Nov. 18, 2010

(30) Foreign Application Priority Data

Apr. 7, 2008 (JP) ................................. 2008-099334

(51) Int. Cl.
*B62D 5/04* (2006.01)
(52) U.S. Cl.
USPC ............................... 318/9; 318/538; 180/6.44

(58) Field of Classification Search
USPC ...... 318/430–434, 9, 10, 14, 15, 538; 180/6.2, 180/6.44, 6.48, 6.5, 6.62, 400, 443, 444
See application file for complete search history.

(56) References Cited

U.S. PATENT DOCUMENTS

| 4,779,031 | A | * | 10/1988 | Arends et al. ................. 318/565 |
| 5,602,451 | A | * | 2/1997 | Kohge et al. .................. 318/293 |
| 6,491,132 | B2 | * | 12/2002 | Bloch et al. ................... 180/446 |
| 6,577,030 | B2 | * | 6/2003 | Tominaga et al. .......... 310/68 B |
| 2002/0060105 | A1 | | 5/2002 | Tominaga et al. | |

FOREIGN PATENT DOCUMENTS

| JP | 09-030434 A | 2/1997 |
| JP | 11-155298 A | 6/1999 |
| JP | 2001-206232 A | 7/2001 |
| JP | 2002-120739 A | 4/2002 |
| JP | 2002-345211 A | 11/2002 |
| JP | 3560701 B2 | 9/2004 |
| JP | 3774624 B2 | 5/2006 |

* cited by examiner

*Primary Examiner* — Bentsu Ro
(74) *Attorney, Agent, or Firm* — Sughrue Mion, PLLC (57) ABSTRACT

A motor for an electric power steering device with an integrated controller (1) includes a motor (2) and a controller (15) which controls driving of the motor (2) and has a metal case, the motor and the controller being formed integrally with each other. The motor (1) is attached to a speed reduction mechanism (23). The motor (2), the controller (15), and the speed reduction mechanism (23) are arranged in this order, in an axial direction, and in substantially coaxial relation with each other. The heat emitted from a driving substrate and the motor can be efficiently transmitted to the speed reduction mechanism.

11 Claims, 9 Drawing Sheets

MOTOR FOR ELECTRIC POWER STEERING DEVICE WITH INTEGRATED CONTROLLER AND ELECTRIC POWER STEERING DEVICE

TECHNICAL FIELD

The present invention relates to a motor for an electric power steering device and an electric power steering device, each of which is attached to a vehicle and assists a steering force of a driver and, more particularly, relates to a technique for integrating with a controller.

BACKGROUND ART

In a conventional motor for an electric power steering device with an integrated controller, a metal substrate provided with a driving circuit is attached to the motor side in a case of a controller.

Furthermore, in the conventional motor for the electric power steering device with the integrated controller, the case of the controller is made of resin. (For example, see patent documents 1 and 2.)

Patent document 1: Japanese Patent Gazette No. 3560701 (pp. 3 to 5, FIG. 3)

Patent document 2: Japanese Patent Gazette No. 3774624 (pp. 5 to 10, FIG. 7)

DISCLOSURE OF THE INVENTION

Problems to be Solved by the Invention

In the conventional motor for the electric power steering device with the integrated controller disclosed in the patent document 1, since a driving substrate (driving circuit) of the controller is attached to the motor side in the case of the controller, heat transfer between the driving substrate and a speed reduction mechanism (gear case) is retarded and the heat emitted from the driving substrate cannot be effectively released to the speed reduction mechanism; and therefore, there is a problem in that the characteristics of components are deteriorated due to the emitted heat and the duration of life becomes shorter.

In addition, heat capacity of the case of the controller needs to be increased to reduce the influence of the emitted heat; and consequently, there is a problem in that outside dimensions, weight, and cost of the device are increased.

Furthermore, in the conventional motor for the electric power steering device with the integrated controller disclosed in the patent document 2, a circuit case of the controller is made of resin; and therefore, there is a problem in that heat transfer between the motor, the controller, and a speed reduction mechanism is retarded and the heat emitted from the motor cannot be effectively released to the speed reduction mechanism.

The present invention has been made to solve the problems as described above, and an object of the present invention is to obtain a motor for an electric power steering device with an integrated controller and an electric power steering device, in each of which the heat emitted from a driving substrate and a motor is effectively transmitted to a speed reduction mechanism, whereby a deterioration in the characteristics of components and a reduction in the duration of life are suppressed and compactness, high performance, and low cost are achieved.

Means for Solving the Problem

A motor for an electric power steering device with an integrated controller according to the present invention includes a motor and a controller which controls driving of the motor and has a metal case, the motor and the controller being formed integrally with each other. The motor for the electric power steering device with the integrated controller is attached to a speed reduction mechanism which decelerates rotation of the motor. The motor, the controller, and the speed reduction mechanism are configured so as to be arranged in this order, in a motor axial direction, and in substantially coaxial relation with each other.

Furthermore, an electric power steering device according to the present invention is configured that a motor for an electric power steering device with an integrated controller is attached to a speed reduction mechanism which decelerates rotation of the motor; and the motor and an attaching portion of the speed reduction mechanism are arranged in substantially coaxial relation with each other.

Advantageous Effect of the Invention

According to the present invention, it is possible to obtain a motor for an electric power steering device with an integrated controller and an electric power steering device, in each of which the heat emitted from a driving substrate and a motor is effectively transmitted to a speed reduction mechanism, whereby a deterioration in the characteristics of components and a reduction in the duration of life are suppressed and compactness, high performance, and low cost are achieved.

The foregoing and other object, features, and advantages of the present invention will become more apparent from the following detailed description of embodiments and description shown in drawings.

DESCRIPTION OF REFERENCE NUMERALS

1 Motor for electric power steering device with integrated controller, 2 Motor, 15 Controller, 16 Motor side case, 17 Speed reduction mechanism side case, 23 Speed reduction mechanism, 24 Control substrate, 25 Microcomputer, 27 Driving substrate, 28 Power element, 29 Attachment surface, 30 Terminal portion, 32 Capacitor, 33 Coil, 35 Rotation sensor, 40 Attaching portion, and 41 Electric power steering device.

BEST MODE FOR CARRYING OUT THE INVENTION

Embodiment 1

An embodiment 1 will be described based on FIG. 1 to FIG. 5. Incidentally, in each of the following drawings, identical or equivalent members will be described with the same reference numerals.

Figure 1:
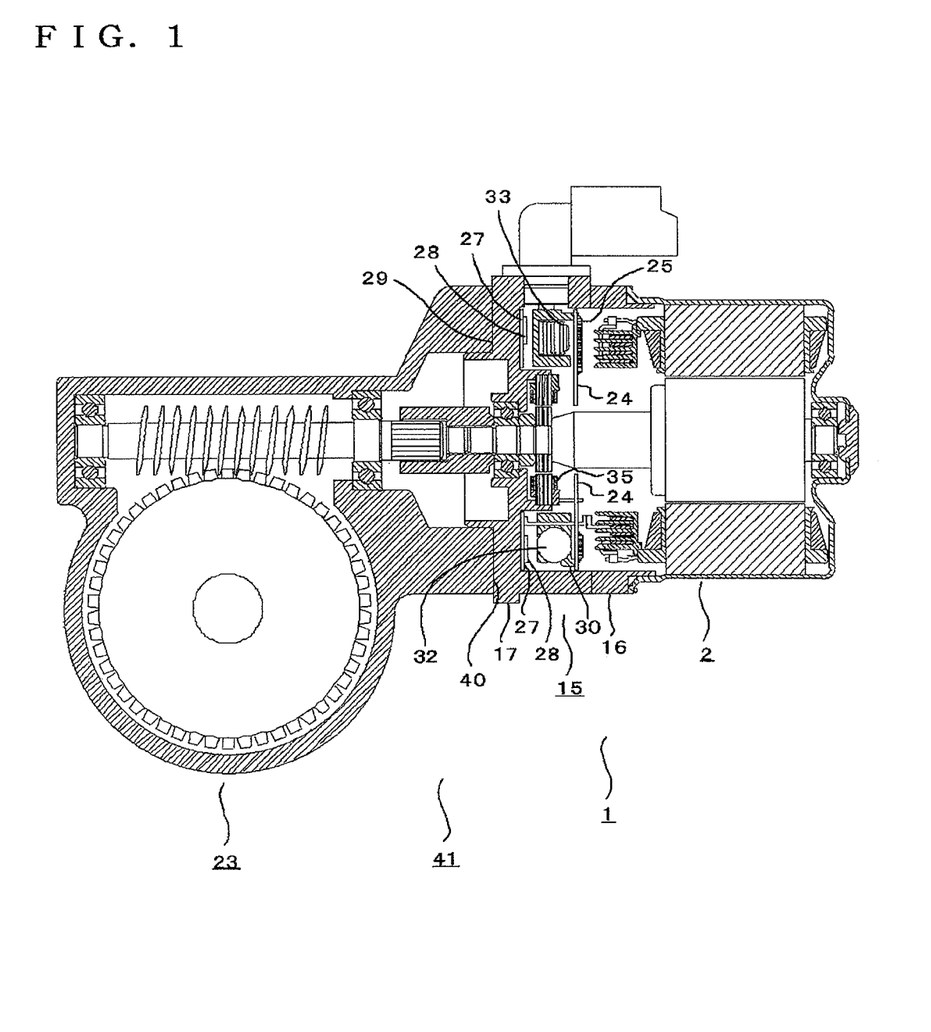
FIG. 1 is a sectional view showing a motor for an electric power steering device with an integrated controller and an electric power steering device according to an embodiment 1 of the present invention.

FIG. 1 is a sectional view showing a motor for an electric power steering device with an integrated controller and an electric power steering device according to the embodiment 1 of the present invention.

Figure 2:
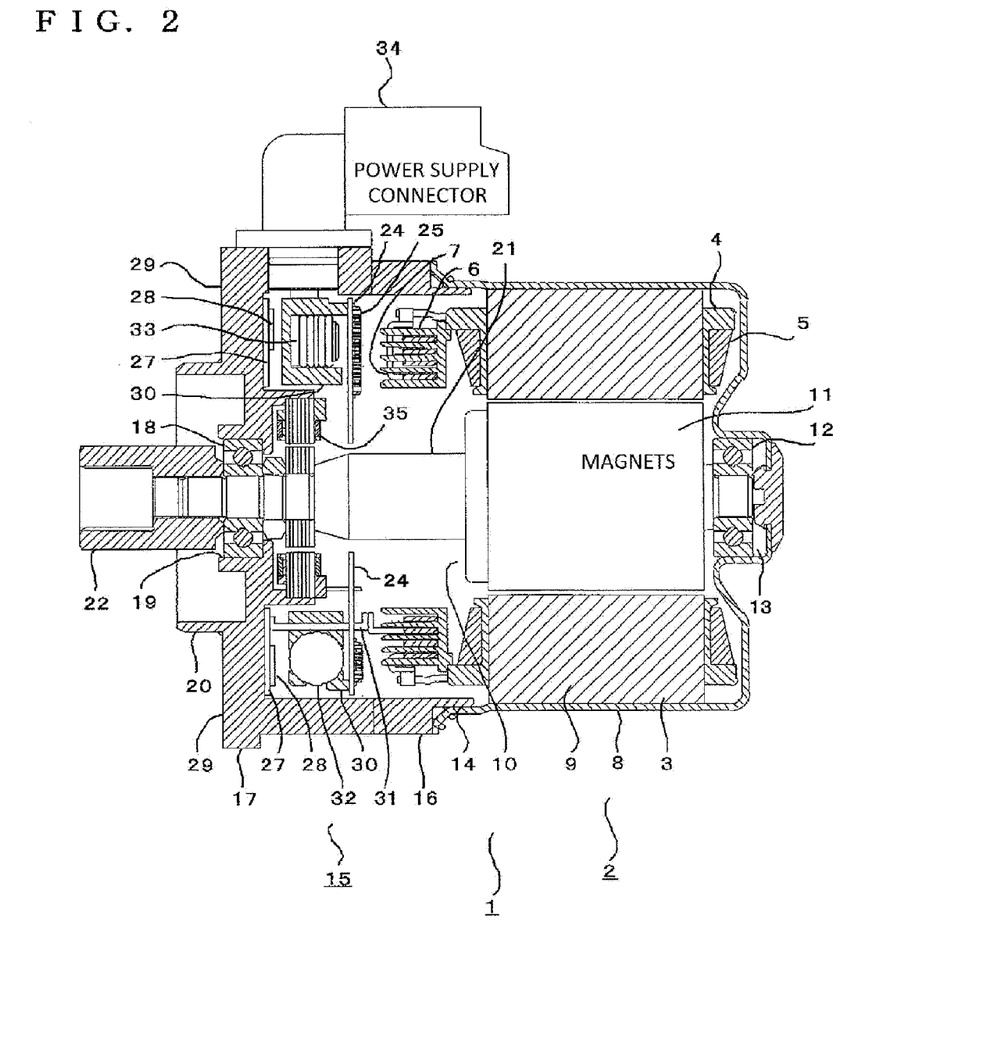
FIG. 2 is a sectional view showing the motor for the electric power steering device with the integrated controller of FIG. 1.

FIG. 2 is a sectional view showing the motor for the electric power steering device with the integrated controller of FIG. 1.

Figure 3:
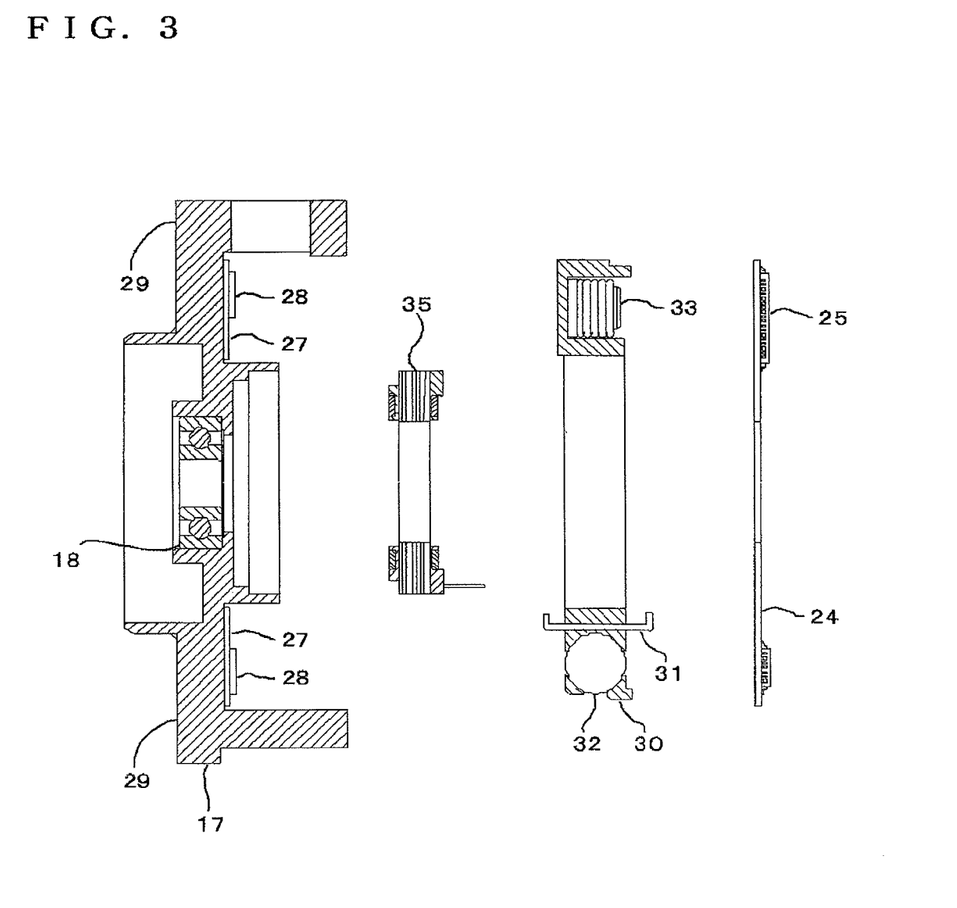
FIG. 3 is an explanation view showing an assembly procedure of a controller of FIG. 2.

FIG. 3 is an explanation view showing an assembly procedure of a controller of FIG. 2.

Figure 4:
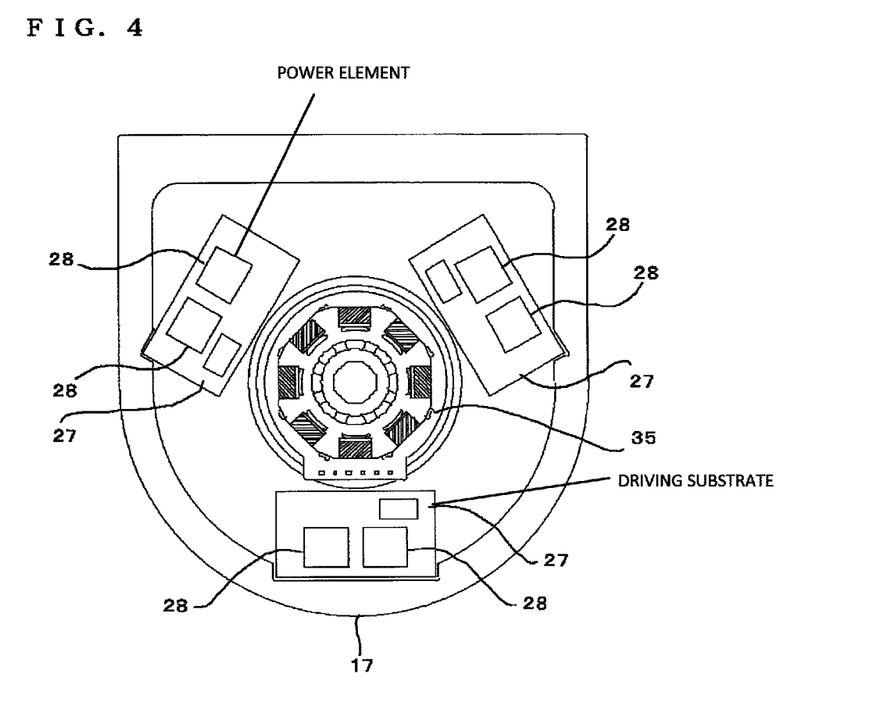
FIG. 4 is a plan view which shows a state where a driving substrate is attached to a speed reduction mechanism side case of FIG. 2, and in which the inside of the case is seen from the motor side.

FIG. 4 is a plan view which shows a state where a driving substrate is attached to a speed reduction mechanism side case of FIG. 2, and in which the inside of the case is seen from the motor side.

Figure 5:
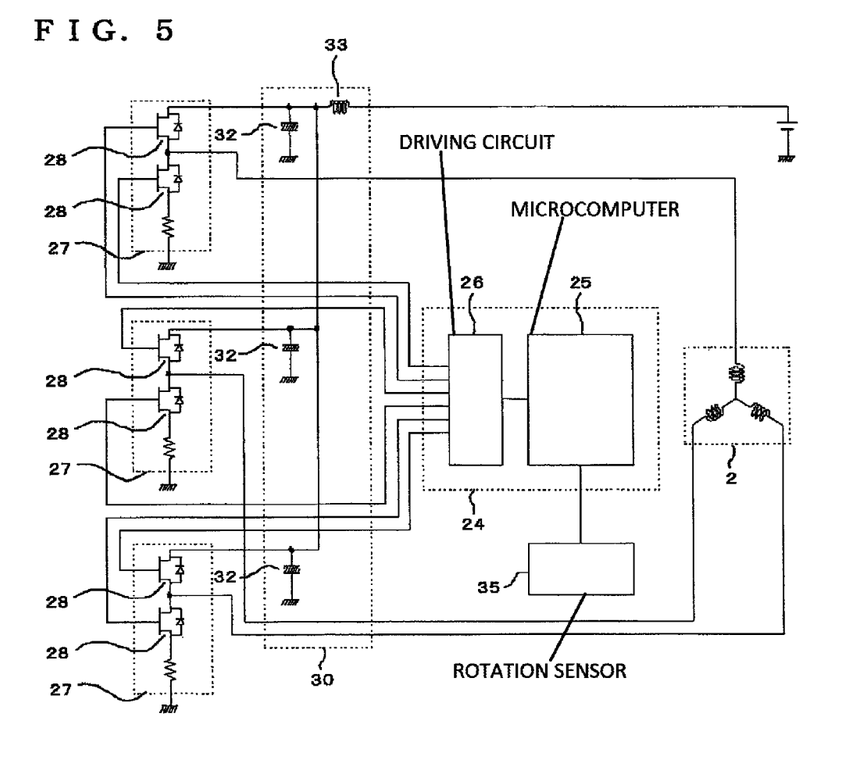
FIG. 5 is a circuit block diagram of FIG. 2.

FIG. 5 is a circuit block diagram of FIG. 2.

In FIG. 1 to FIG. 5, a motor 2 is a permanent magnet synchronous motor; and a three-phase stator winding 5 is wound around a stator core 3, which is formed by laminating magnetic steel sheets, via a resin-made insulator 4. Respective phase windings are connected in star or delta by winding terminals 7 incorporated in a resin-made terminal holder 6. The stator core 3 is inserted with force into an iron-made frame 8 and forms a stator 9 of the motor 2.

A bottom portion is provided on one end portion of the frame 8; and at a central portion of the bottom portion, a rear bearing box portion 13 for accommodating a rear bearing 12 which is for supporting one end of a rotor 10 is formed. Magnets 11 for forming a field system are attached to an outer peripheral portion of a shaft 21 of the rotor 10.

The other end portion of the frame 8 is opened and a spigot joint portion 14 which is for close fitting to a motor side case 16 of a controller 15 is formed. The motor side case 16 is formed by a die cast molding of aluminum alloy; and the motor side case 16 is jointed to a speed reduction mechanism side case 17 of the controller 15 on one end thereof.

The speed reduction mechanism side case 17 is formed by a die cast molding of aluminum alloy; and at a central portion of the speed reduction mechanism side case 17, a front bearing box portion 19 for accommodating a front bearing 18 which is for supporting one end of the rotor 10 is formed.

An attachment surface 29 and an attaching spigot joint portion 20 which are for attaching to an attaching portion 40 integrally formed with a speed reduction mechanism 23 are provided on the other end portion of the speed reduction mechanism side case 17.

A resolver serving as a rotation sensor 35 is attached to the central portion on the motor 2 side of the speed reduction mechanism side case 17.

A boss 22 serving as a coupling which is for joining to the speed reduction mechanism 23 is attached to an end portion on the speed reduction mechanism side of the shaft 21.

The controller 15 has a glass epoxy-made control substrate 24 mounted with a microcomputer 25, and a field effect transistor (FET) driving circuit 26 and a metal-base driving substrate 27 mounted with a power element 28 such as a power metal oxide semiconductor field effect transistor (MOSFET). A terminal portion 30 in which a copper-made terminal 31 which is for electrically connecting the control substrate 24 and the driving substrate 27 is insert-molded with resin and is integrally formed, is intermediately disposed between the control substrate 24 and the driving substrate 27 in a motor axial direction.

The control substrate 24 is disposed on an end portion on the motor 2 side of the terminal portion 30 and the terminal portion 30 is intermediately disposed between the driving substrate 27 and the control substrate 24; and accordingly, a certain spatial distance is secured between the driving substrate 27 and the control substrate 24.

The driving substrate 27 is disposed opposite to the attaching portion 40 of the speed reduction mechanism 23 in the axial direction. The driving substrate 27 is provided so as to be firmly attached to a wall on the inner side (motor 2 side) of the speed reduction mechanism side case 17 in which the attachment surface 29 is closely fixed to the attaching portion 40.

Then, at least a part of the driving substrate 27 is disposed at a position overlapped with the attaching portion 40 in a radial direction.

The terminal portion 30 is mounted with a capacitor 32 for absorbing ripples of a current flowing through the motor 2, and is connected to the power element 28 of the driving substrate 27 via a conductive terminal (not shown in the drawing).

Furthermore, the terminal portion 30 is mounted with a coil 33 for absorbing noise, and is connected to a power supply connector 34 via a conductive terminal (not shown in the drawing).

Next, the assembly procedure of the controller 15 will be described using FIG. 3 and FIG. 4.

First, the driving substrate 27 divided into three sections for each phase of U, V, and W of the motor 2 is attached to the inside of the speed reduction mechanism side case 17. Next, the resolver serving as the rotation sensor 35 is attached to the central portion on the motor 2 side of the speed reduction mechanism side case 17. Next, the terminal portion 30 mounted with the capacitor 32 and the coil 33 is attached to the speed reduction mechanism side case 17. Finally, the control substrate 24 mounted with the microcomputer 25 is disposed on the end portion on the motor 2 side of the terminal portion 30 and is integrated as the controller 15. Consequently, as the assembly order, the driving substrate 27, the rotation sensor 35, the terminal portion 30, and the control substrate 24 are built up in order on the speed reduction mechanism side case 17. After that, the rotor 10, the motor side case 16, and the motor 2 are assembled to the controller 15 and, accordingly, completed as the motor for the electric power steering device with the integrated controller 1.

Further, the motor for the electric power steering device with the integrated controller 1 is attached to the speed reduction mechanism 23 provided with the attaching portion 40 substantially coaxial to the motor for the electric power steering device with the integrated controller 1; and accordingly, an electric power steering device 41 is configured.

In the thus configured motor for the electric power steering device with the integrated controller 1, the motor 2 and the controller 15 which controls driving of the motor 2 and has the metal case (the speed reduction mechanism side case 17, or the speed reduction mechanism side case 17 and the motor side case 16) are formed integrally with each other and are attached to the speed reduction mechanism 23 which decelerates the motor 2. Then, the motor 2, the controller 15, and the speed reduction mechanism 23 are arranged in this order in the motor axial direction; and the motor 2, the controller 15, and the speed reduction mechanism 23 are arranged substantially coaxial to the motor axis. Consequently, heat transmission paths between the driving substrate 27, the motor 2, and the speed reduction mechanism 23 become shorter; the heat emitted from the power element 28 and the motor 2 mounted on the driving substrate 27 is effectively transmitted to the speed reduction mechanism. 23 via the metal case; heat dissipation properties are improved; and a reduction in size, an increase in performance, and a reduction in cost of the device can be achieved.

Furthermore, the motor 2, the controller 15, and the attaching portion 40 of the speed reduction mechanism 23 are arranged substantially coaxial to the motor shaft; and therefore, a specifically projected portion is not present and attachment and layout are easy. More particularly, because of the substantially coaxial relation, for example, the contact area of the of the junction portion between respective members related to heat conduction can be efficiently secured; and accordingly, the emitted heat can be efficiently transmitted to the speed reduction mechanism 23 side and the motor for the electric power steering device with the integrated controller 1 and the electric power steering device 41 can be reduced in size and in cost as the whole device.

In addition, the control substrate 24 is disposed on the motor 2 side in the controller 15 and the driving substrate 27 is disposed on the speed reduction mechanism 23 side in the controller 15; and therefore, the heat transmission path between the driving substrate 27 and the speed reduction mechanism 23 becomes shorter and heat dissipation of the power element 28 mounted on the driving substrate 27 can be efficiently performed.

The control substrate 24 is attached to the terminal portion 30; and therefore, the number of components is reduced and assembly performance is improved.

At least the part of the driving substrate 27 is disposed at the position overlapped with the attaching portion 40 of the speed reduction mechanism 23 in the radial direction, the position being opposite to the attaching portion in the axial direction; and therefore, the heat transmission path between the driving substrate 27 and the speed reduction mechanism 23 becomes shorter and heat-transfer resistance can be reduced. Consequently, the heat emitted from the power element 28 mounted on the driving substrate 27 can be effectively transmitted to the speed reduction mechanism side case 17 and the speed reduction mechanism 23; and therefore, heat dissipation properties of the power element 28 are improved; heat resistance properties are improved; and a reduction in size, an increase in performance, and a reduction in cost of the device can be achieved.

More specifically, the power element 28 is disposed at the position overlapped with the attaching portion 40 of the speed reduction mechanism 23 in the radial direction; and accordingly, the effect can be further improved.

In this case, the reasons why the reduction in size, the increase in performance, and the reduction in cost of the device are achieved by improving the heat dissipation properties are as follows: a heat sink having large heat capacity for securing heat resistance properties does not need to be provided; even if heat resistance properties of a component to be used are equivalent, operational restriction for securing the heat resistance properties (for example, current restriction) can be eliminated or reduced; a deterioration in the characteristics of components (for example, ON resistance of the power element of the controller, surface magnetic flux density of the motor magnets) due to the emitted heat can be reduced; a component or a material with high heat resistance properties does not need to be selected; and the like.

Furthermore, the case of the controller 15 disposed between the motor 2 and the speed reduction mechanism 23 is divided into two separate sections (divided into a plurality of sections): at least the motor side case 16 attached with the motor 2 and the speed reduction mechanism side case 17 attached with the driving substrate 27; thus, the volume ratio and the degree of thermal coupling of the motor side case 16 and the speed reduction mechanism side case 17 can be freely set depending on thermal design of the whole device; and accordingly, optimum thermal design can be performed, and a reduction in size and an increase in performance of the device can be achieved.

For example, in the case where heat resistance properties of the whole device depend on the heat emitted from the motor 2 rather than the power element 28, the volume of the motor side case 16 is increased, and the degree of thermal coupling between the speed reduction mechanism side case 17 and the motor side case 16 is improved by increasing the area of the junction portion therebetween and by improving the degree of joining therebetween; and accordingly, the heat emitted from the motor 2 can be easily transmitted to the speed reduction mechanism 23 via the motor side case 16 and the speed reduction mechanism side case 17.

Furthermore, for example, in the case where the heat resistance properties of the whole device depend on the heat emitted from the power element 28, the volume of the speed reduction mechanism side case 17 is increased, and the degree of thermal coupling between the speed reduction mechanism side case 17 and the motor side case 16 is reduced by decreasing the area of the junction portion therebetween and by reducing the degree of joining therebetween; and accordingly, it is possible to suppress the heat emitted from the motor 2 from being transmitted to the driving substrate 27 side mounted with the power element 28.

Besides, the terminal portion 30 is intermediately disposed in the motor axial direction between the control substrate 24 mounted with the microcomputer 25 that is a non-heating component and the driving substrate 27 mounted with the power element 28 that is a heating component, and connects the both substrates; and the both substrates are arranged thermally separated from each other with a certain distance. Therefore, the control substrate 24 is difficult to be influenced by the heat emitted from the driving substrate 27, and the microcomputer 25 or the like mounted on the control substrate 24 is stably operated even if the heat emitted from the power element 28 is increased in high load operation and at high ambient temperature; and accordingly, heat resistance properties are improved and a stabilization of performance can be achieved.

Further, since the capacitor 32 and the coil 33 that are heating components are attached to the terminal portion 30, the capacitor 32 and the coil 33 can be thermally separated from the control substrate 24 and the driving substrate 27, and the control substrate 24 and the driving substrate 27 are difficult to be influenced by the heat emitted from the capacitor 32 and the coil 33; and accordingly, heat resistance properties are improved and a reduction in size, an increase in performance, and a stabilization of performance of the device can be achieved.

Both the capacitor 32 and the coil 33 that are relatively large in shape and the heating components are attached to the terminal portion 30; and therefore, it is possible to be more effectively and thermally separated.

In addition, both the capacitor 32 and the coil 33 that are relatively large in shape are attached to the terminal portion 30; and therefore, the arrangement of components is easy and the rotation sensor 35 can be disposed on the inside of the terminal portion 30 in which the capacitor 32 and the coil 33 are arranged; and accordingly, the device can be reduced in size.

Embodiment 2

Figure 6:
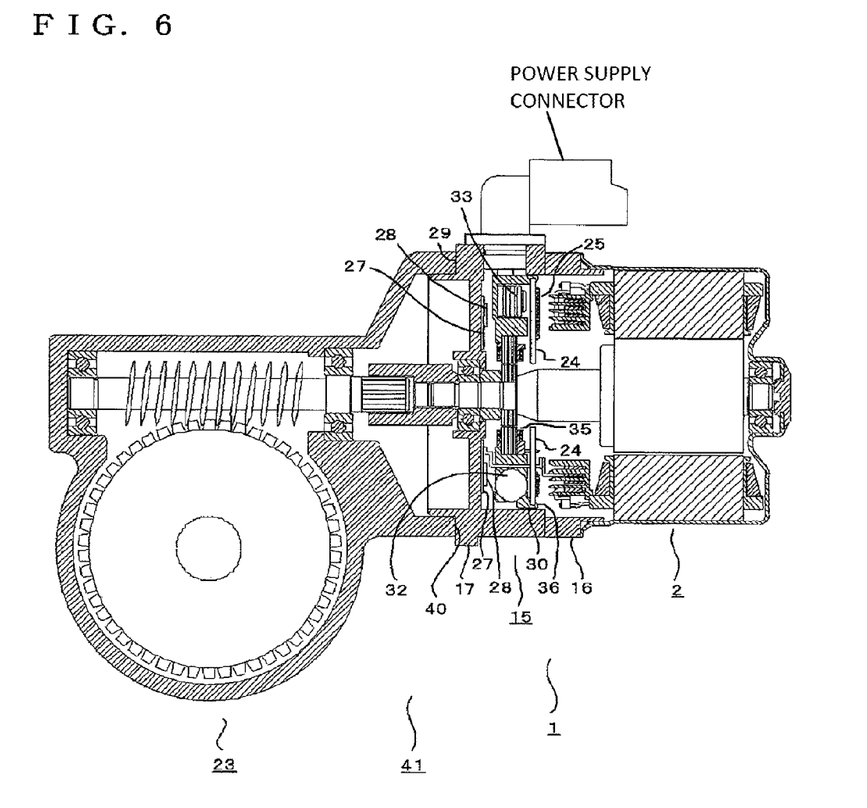
FIG. 6 is a sectional view showing a motor for an electric power steering device with an integrated controller and an electric power steering device according to an embodiment 2 of the present invention.

FIG. 6 is a sectional view showing a motor for an electric power steering device with an integrated controller and an electric power steering device according to an embodiment 2 of the present invention.

Figure 7:
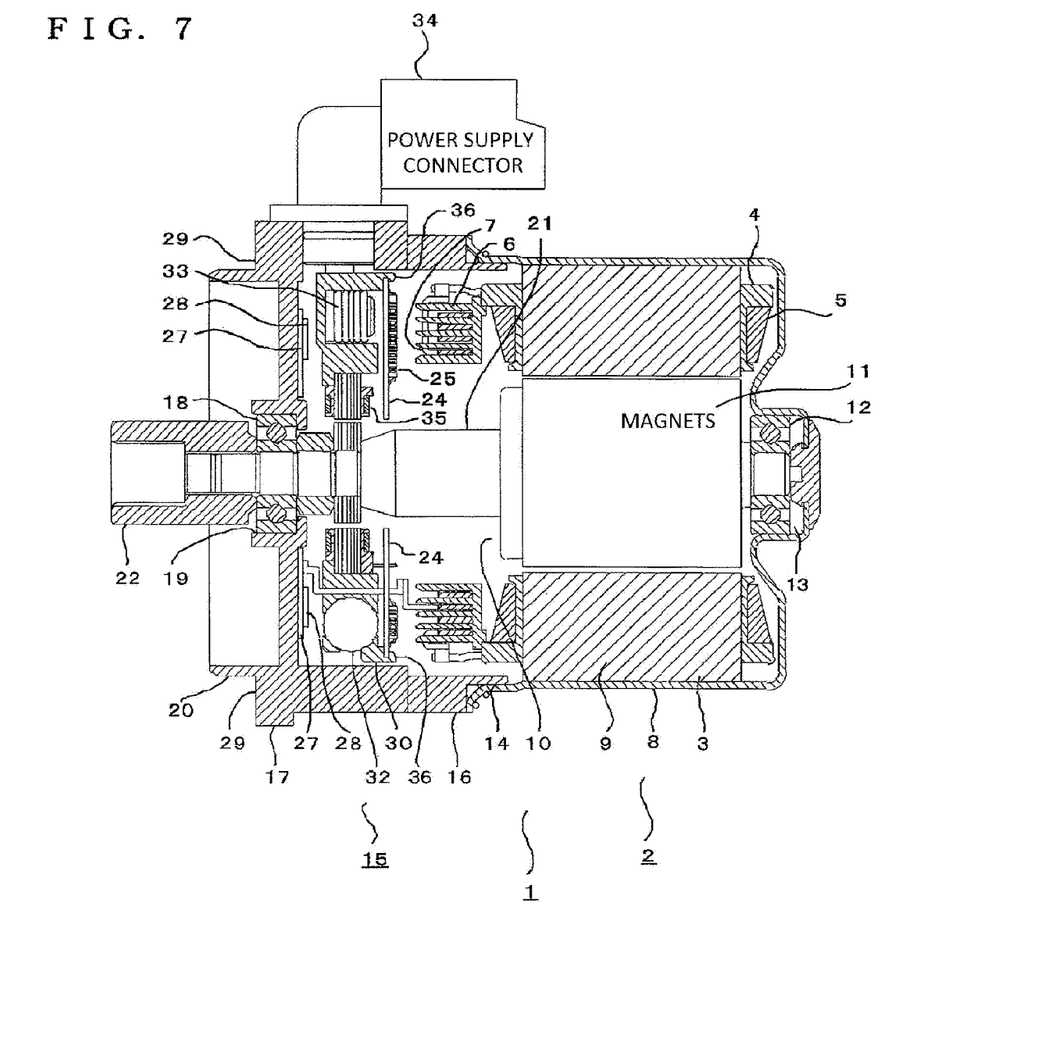
FIG. 7 is a sectional view showing the motor for the electric power steering device with the integrated controller of FIG. 6.

FIG. 7 is a sectional view showing the motor for the electric power steering device with the integrated controller of FIG. 6.

Figure 8:
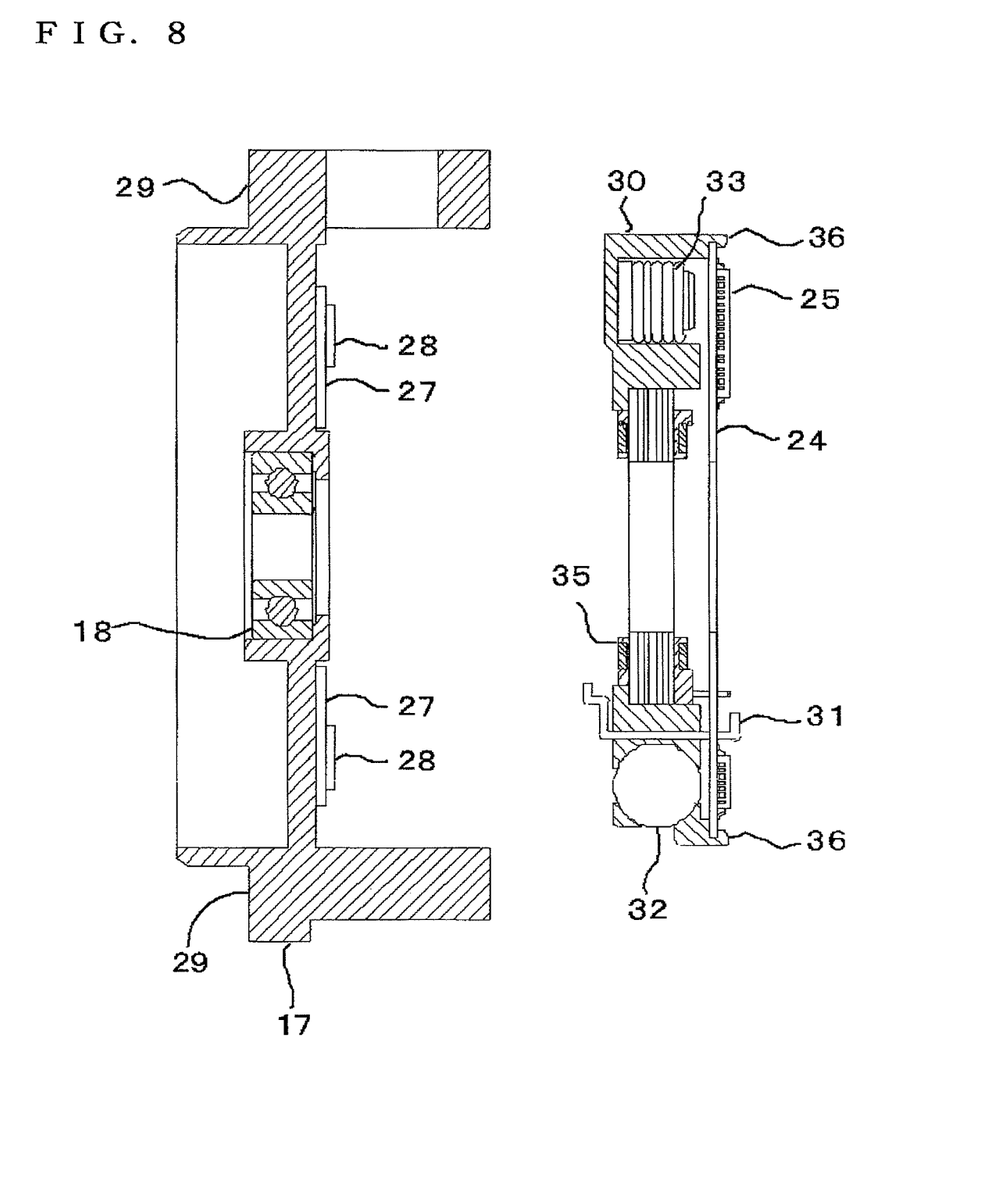
FIG. 8 is an explanation view showing an assembly procedure of a controller of FIG. 6.

FIG. 8 is an explanation view showing an assembly procedure of a controller of FIG. 6.

Figure 9:
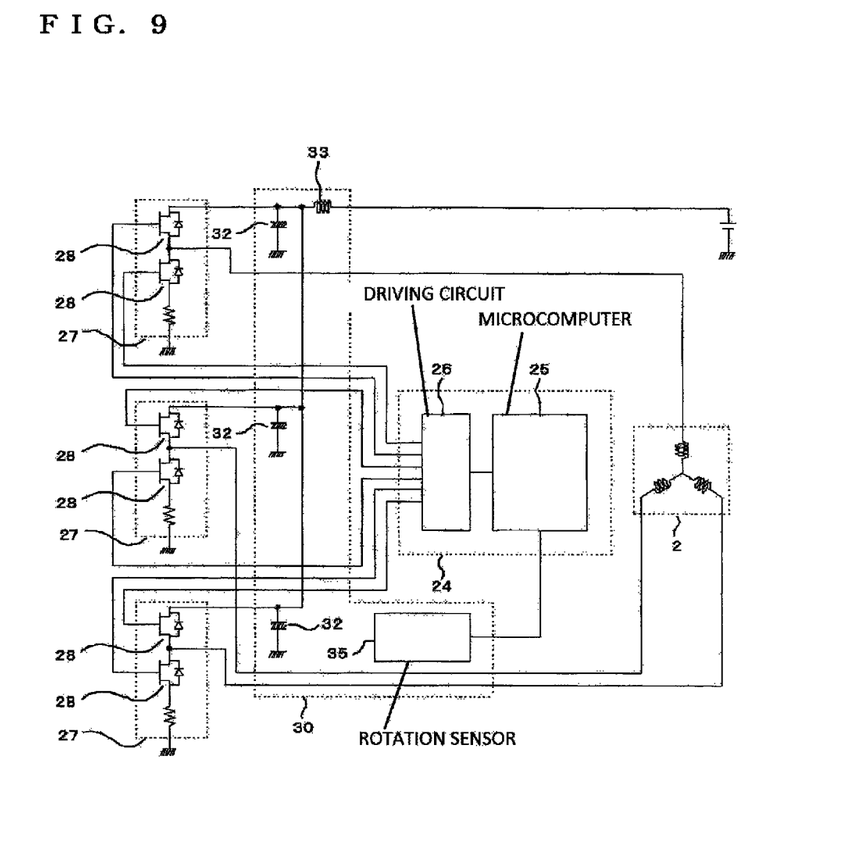
FIG. 9 is a circuit block diagram of FIG. 6.

FIG. 9 is a circuit block diagram of FIG. 6.

A motor for an electric power steering device with an integrated controller 1 and an electric power steering device 41 of the embodiment 2 are different in the configuration of portions to be described hereinafter, as compared to the embodiment 1.

The resolver serving as the rotation sensor 35 is attached to the central portion on the motor 2 side of the speed reduction mechanism side case 17 in the embodiment 1; however, in the embodiment 2, a resolver serving as a rotation sensor 35 is attached and fixed to the inside of a central portion of a terminal portion 30.

As in the embodiment 1, a driving substrate 27 is provided so as to be firmly attached to an inside wall of a surface of a speed reduction mechanism side case 17, the surface being opposite to a speed reduction mechanism 23; however, the driving substrate 27 is disposed nearer to a motor central axis as compared to the embodiment 1. This is because that the rotation sensor 35 is not attached to the central portion of the speed reduction mechanism side case 17 in the embodiment 2; and therefore, this part can be used as an attaching space for the driving substrate 27.

Furthermore, in the embodiment 2, the driving substrate 27 is not disposed at a position overlapped with an attaching portion 40 of the speed reduction mechanism 23 in a radial direction. A control substrate 24 is disposed on an end portion on the motor 2 side of the terminal portion 30, as in the embodiment 1; however, attachment to the terminal portion 30 is made by a snap fit portion 36 provided on the terminal portion 30. Other part's configuration and function are the same as the embodiment 1.

Next, the assembly procedure of the controller will be described using FIG. 8. First, the driving substrates 27 divided into three sections for each phase of U, V, and W of the motor 2 are attached on the inside of the speed reduction mechanism side case 17.

Next, the terminal portion 30 to which a capacitor 32, a coil 33, the resolver serving as the rotation sensor 35, and the control substrate 24 are previously attached is attached to the speed reduction mechanism side case 17 and integrated as a controller 15. Thus, as the assembly order, the driving substrate 27 and the terminal portion 30 unitized in a separate process are built up on the speed reduction mechanism side case 17. After that, a rotor 10, a motor side case 16, and the motor 2 are assembled to the controller 15 and, accordingly, completed as the motor for the electric power steering device with the integrated controller 1.

In the thus configured motor for the electric power steering device with the integrated controller 1, the capacitor 32, the coil 33, the resolver serving as the rotation sensor 35, and the control substrate 24 are previously attached to the terminal portion 30 and can be unitized; and therefore, as compared to the embodiment 1, there is an advantage in that assembly of the controller 15 becomes easier and a reduction in manufacturing cost of the device can be achieved.

Furthermore, since the rotation sensor 35 is attached to the terminal portion 30, the vicinity of the central portion of the speed reduction mechanism side case 17, the central portion being attached with the rotation sensor in the embodiment 1, can be used as the attaching space for the driving substrate 27; and accordingly, there is an advantage in that attachment of the driving substrate 27 becomes easier and the device can be reduced in size.

Besides, since the rotation sensor 35 and the control substrate 24 are attached to the terminal portion 30 in a state where the speed reduction mechanism side case 17 is not present, the speed reduction mechanism side case 17 does not interfere in the case of work where the rotation sensor 35 is connected to the control substrate 24; and accordingly, as compared to the embodiment 1, there is an advantage in that the work where the rotation sensor 35 is connected to the control substrate 24 can be more easily performed.

Incidentally, the speed reduction mechanism side case 17 and the speed reduction mechanism 23 in the embodiment 1 and the embodiment 2 are configured by separate members; however, these members may be configured as an integrally formed member. By providing such an integrated configuration, thermal conductivity between the driving substrate 27 and the speed reduction mechanism 23 is further improved and heat resistance properties of the device can be further improved. Furthermore, since the speed reduction mechanism side case and the speed reduction mechanism are integrally formed, the speed reduction mechanism side case 17 is eliminated; and accordingly, there are advantages in that a reduction in the number of components and the resultant reduction in the number of assembly works, a reduction in cost, and a reduction in weight are achieved.

In the electric power steering device 41 in which the speed reduction mechanism side case 17 and the attaching portion 40 of the speed reduction mechanism 23 are configured as the integrated configuration, there are advantages as described above, for example, a reduction in size and a reduction in cost can be further achieved as the whole device 41.

In addition, material of the driving substrate 27 of the embodiment 1 and the embodiment 2 is not limited to metal; but, for example, the power element may be mounted by bare chip assembly on a ceramic substrate. With this configuration, thermal conductivity between the power element and the speed reduction mechanism side case can be further improved and the heat resistance properties of the device can be further improved.

Incidentally, the type of the motor 2 of the embodiment 1 and the embodiment 2 is described by the permanent magnet synchronous motor; however, the motor type is not limited to this; and it is to be clearly understood that, for example, an induction motor and a motor with a brush may be used.

Furthermore, the frame 8 is described by the iron-made frame; however, the frame may be made of aluminum material; and in this case, heat conduction can be further improved.

Besides, the rotation sensor 35 of the embodiment 1 and the embodiment 2 is a resolver system; however, other system such as a hall system may be used, as long as other system is applicable to the motor for the electric power steering device. In this case, for example, if the rotation sensor 35 is the hall system, a space required for attaching the sensor can be reduced as compared to the resolver system; and therefore, there is an advantage in that a reduction in size and a reduction in weight of the device are achieved.

In addition, the motor for the electric power steering device with the integrated controller 1 and the controller 15 of the electric power steering device 41 of the present invention has a function of reference position adjustment of the rotation sensor 35. The reference position adjustment is to adjust a position of an output angle of 0 degree of the rotation sensor 35 to a predetermined position of a rotation angle of the rotor 10 of the motor 1, for example, the adjustment is to adjust to a zero cross point of an induced voltage of U phase; and in the conventional motor, the adjustment is performed by mechanically rotating the rotation sensor 35 and fixing to a predetermined position.

Despite this, in the motor 1 of the present invention, since the rotation sensor 35 is fixed to the inside of the motor 1, the rotation sensor 35 cannot be rotated from the outside; and therefore, means for electrically correcting the reference position by the controller 15 is used.

As the specific means of the reference position adjustment, there is a method in which a DC current is energized between predetermined phases of the motor 1 and energization lock of the rotor 10 of the motor 1 is performed, and a difference between an ideal angle detection value and an actual angle detection value of the rotation sensor 35 at that time is stored as a correction value. Incidentally, the method of the reference position adjustment is not limited to the above mentioned method; but, a method for taking the average at a plurality of energization lock positions, a method of directly comparing with an induced voltage, and the like may be used.

INDUSTRIAL APPLICABILITY

The present invention is suitable for use in an electric power steering device which assists a steering force of a driver.

The invention claimed is:

1. A motor for an electric power steering device with an integrated controller, comprising:
    a motor; and
    a controller which controls driving of said motor and has a metal case,
    said motor and said controller being formed integrally with each other,
    said motor for the electric power steering device with the integrated controller being attached to a speed reduction mechanism which decelerates rotation of said motor, and
    said motor, said controller, and said speed reduction mechanism being arranged in this order, in a motor axial direction, and in substantially coaxial relation with each other.

2. The motor for the electric power steering device with the integrated controller according to claim 1,
    wherein said controller includes:
    a control substrate mounted with a microcomputer; and
    a driving substrate mounted with a power element,
    said control substrate being disposed on the motor side in said controller, and
    said driving substrate being disposed on the speed reduction mechanism side in said controller.

3. The motor for the electric power steering device with the integrated controller according to claim 2,
    wherein at least a part of said driving substrate is disposed at a position overlapped with an attaching portion of said speed reduction mechanism in a radial direction.

4. The motor for the electric power steering device with the integrated controller according to claim 1,
    wherein said case of said controller disposed between said motor and said speed reduction mechanism is divided into a plurality of sections, and is composed of at least a speed reduction mechanism side case attached with said driving substrate on which a power element is mounted and a motor side case attached with said motor.

5. The motor for the electric power steering device with the integrated controller according to claim 1,
    wherein said controller includes:
    a control substrate mounted with a microcomputer; and
    a driving substrate mounted with a power element, and
    further comprising a terminal portion which is for connecting said control substrate and said driving substrate and is disposed between said control substrate and said driving substrate.

6. The motor for the electric power steering device with the integrated controller according to claim 5,
    wherein said terminal portion is attached with a capacitor which absorbs ripples of a current flowing through said motor.

7. The motor for the electric power steering device with the integrated controller according to claim 5,
    wherein said terminal portion is attached with a coil which absorbs noise.

8. The motor for the electric power steering device with the integrated controller according to claim 5,
    wherein said terminal portion is attached with said control substrate.

9. The motor for the electric power steering device with the integrated controller according to claim 5,
    wherein said terminal portion is attached with a rotation sensor.

10. The motor for the electric power steering device with the integrated controller according to claim 5,
    wherein said terminal portion is attached with a capacitor which absorbs ripples of a current flowing through said motor, a coil which absorbs noise, said control substrate, and a rotation sensor.

11. An electric power steering device comprising:
    a motor for an electric power steering device with an integrated controller as set forth in claim 1; and
    a speed reduction mechanism which decelerates rotation of said motor,
    said motor being attached to said speed reduction mechanism, and
    said motor and an attaching portion of said speed reduction mechanism being arranged in substantially coaxial relation with each other.

* * * * *